US008332062B2

(12) United States Patent
Kako et al.

(10) Patent No.: US 8,332,062 B2
(45) Date of Patent: Dec. 11, 2012

(54) METHOD OF DESIGNING AND MANUFACTURING CAM DEVICE AND THREE-DIMENSIONAL DESIGN-SUPPORT COMPUTER PROGRAM FOR THE SAME

(75) Inventors: Hiroyoshi Kako, Tokyo (JP); Satoshi Nakamura, Tokyo (JP); Akihito Ishizaka, Tokyo (JP)

(73) Assignee: Sankyo Oilless Industry, Inc., Tokyo (JP)

( * ) Notice: Subject to any disclaimer, the term of this patent is extended or adjusted under 35 U.S.C. 154(b) by 260 days.

(21) Appl. No.: 12/941,113

(22) Filed: Nov. 8, 2010

(65) Prior Publication Data

US 2011/0202158 A1 Aug. 18, 2011

(30) Foreign Application Priority Data

Feb. 16, 2010 (JP) ................................. 2010-031007

(51) Int. Cl.
*G06F 19/00* (2011.01)
*G06Q 30/00* (2012.01)
(52) U.S. Cl. ........................................ 700/98; 705/26.5
(58) Field of Classification Search ................... 700/95, 700/97, 98; 703/1, 2; 705/26.1, 26.5; 706/919, 706/922, 923
See application file for complete search history.

(56) References Cited

U.S. PATENT DOCUMENTS

| | | | | |
|---|---|---|---|---|
| 6,233,538 B1 * | 5/2001 | Gupta et al. | ...................... | 703/6 |
| 6,243,611 B1 * | 6/2001 | Hazama et al. | ................. | 700/97 |
| 7,725,206 B2 * | 5/2010 | Richey | ............................ | 700/98 |
| 7,840,443 B2 * | 11/2010 | Lukis et al. | .................. | 705/26.4 |
| 7,957,830 B2 * | 6/2011 | Lukis et al. | .................... | 700/160 |
| 2001/0047251 A1 * | 11/2001 | Kemp | ................................ | 703/1 |
| 2002/0010522 A1 * | 1/2002 | Martin | ............................. | 700/97 |
| 2005/0120010 A1 * | 6/2005 | Philpott et al. | ..................... | 707/3 |
| 2005/0278271 A1 * | 12/2005 | Anthony et al. | .............. | 706/919 |
| 2006/0052892 A1 * | 3/2006 | Matsushima et al. | .......... | 700/98 |
| 2009/0063309 A1 * | 3/2009 | Stephens | ........................ | 705/29 |

FOREIGN PATENT DOCUMENTS

JP 2008-242609 10/2008

OTHER PUBLICATIONS

Luo et al, "The development of an intelligent Web-based rapid prototyping manufacturing system", IEEE Transactions on Automation Science and Engineering, vol. 1, Issue: 1, Publication Year: 2004, pp. 4-13.*

* cited by examiner

*Primary Examiner* — Crystal J Barnes-Bullock
(74) *Attorney, Agent, or Firm* — Wenderoth, Lind & Ponack, LLP.

(57) ABSTRACT

There is provided a method of designing and manufacturing a cam device using a three-dimensional design-support computer program including a customer setup program for customers and a manufacture setup program for cam device manufactures being configured to generate different finenesses in 3D models and characteristic values of cam performance as a result of design of the cam device, and being configured to obtain a result which indicates the same cam device except for fineness and the required calculation items when the same parameters are loaded. The customer setup program is lent from the cam device manufacture to the customer, and detailed design to constructional details of the cam device is performed using the manufacture setup program on the basis of design data created using the customer setup program and handed to the cam device manufacturer, whereby the cam device is manufactured on the basis of a detailed design drawing.

4 Claims, 8 Drawing Sheets

METHOD OF DESIGNING AND MANUFACTURING CAM DEVICE AND THREE-DIMENSIONAL DESIGN-SUPPORT COMPUTER PROGRAM FOR THE SAME

BACKGROUND OF THE INVENTION

1. Field of the Invention

The present invention relates to a method of designing and manufacturing a cam device used by being mounted on a press die for processing works such as automobile panels, the method being configured to determine the shapes of the cam device according to processing abilities or the like required by customers (users such as automobile manufacturers which are in need of the cam device), and also to a three-dimensional design-support computer program that efficiently supports the design of the cam device.

2. Prior Art

In the prior art, a cam device to be used for a press die (or referred to as "cam unit") is selected from those presented on catalogues or the like as standard products on the basis of requirements of customers in many cases. However, in the case of the cam devices as the standard products as described above, various factors such as size, an amount of motion, a processing power, a returning power, and a moment power of the cam device often do not match the customers' requests due to the restrictions of the cam device mounting spaces in the press dies. In such a case, the customers design their own cam devices by themselves and place orders with cam device manufactures for the cam device as a custom-made cam. However, for example, in the case of three-dimensional design-support software on the basis of a computer program used in design of cam device (CAD: Computer Aided Design or Computer Assisted Drafting, Computer Assisted Drawing), there is no suitable design-support program which contributes to easy designing of the desired cam devices and is capable of designing the cam without leaking the manufacture's design know-how in the relationship between the customers and the manufacturers as matters now stand. On the other hand, a computer program disclosed in JP-A-2008-242609 is known as general three-dimensional design-support software for designing devices and equipment, although it does not relate to the cam device.

However, in the case where the cam devices are designed by customers such as die manufacturers in the prior art, for example, as there are a few designers having a general knowledge about the cam device, the cam devices designed by designers of the customers are often required to be corrected in design by the cam device manufactures on the order-receiving side when finally deciding the processing power, the stroke, etc. Therefore, repeated exchanges between the customers and the manufactures are necessary to confirm and correct the designed dimensions including details of the cam devices, thereby requiring long time and many steps. If the cam device manufacturers provide the customers with the design reference or the design-support software of the cam device, most of the problems are solved for sure. However, the cam device manufacturers side has concern about the leak of the design know-how, so that the software that the manufactures use cannot be handed to the customer as-is.

SUMMARY OF THE INVENTION

In view of such problem, it is an object of the invention to develop a three-dimensional design-support computer program for solving the above-described problems, and to provide a method of designing and manufacturing cam devices with improved usage of the computer program.

Accordingly, a first aspect of the invention provides a method of designing and manufacturing a cam device using a three-dimensional design-support computer program including a customer setup program for customers and a manufacture setup program for cam device manufactures, the customer setup program and the manufacture setup program being configured to generate different finenesses in 3D models and characteristic values of cam performance, which are output or displayed as a result of design of the cam device, and being configured so as to obtain a result which indicates the same cam device except for fineness and the required calculation items when same parameters are loaded, wherein the customer setup program is lent from the cam device manufacture to the customer on the assumption of an order placement of the cam device to the cam device manufacture from the customer, and detailed design to constructional details of the cam device is performed using the manufacture setup program on the basis of design data created using the customer setup program and handed to the cam device manufacturer, whereby the cam device is manufactured on the basis of the detailed design drawing.

A second aspect of the invention provides a three-dimensional design-support computer program including a customer setup program and a manufacturer setup program, wherein the customer setup program is configured to calculate the shape of a component which affects a region solid from among components which constitute an entire cam device, a positional relationship of the component in the entire cam device, and characteristic values of the cam performance according to parameters entered by a customer, and to display results as the region solid and numerical values, the region solid representing a region occupied by the shape of the component with respect to the entire cam device when being displayed by a display part on a display device, and the manufacture setup program is configured to load parameters which have satisfied conditions required by the customer using the customer setup program and supplied thereto as arguments, and reproduce the cam device designed by the customer including the constructional details on the basis of the arguments without restrictions of fineness.

The customer setup program preferably includes at least a function to continuously modify a shape of a basic 3D model prepared according to the size and usage of the cam device until a required cam device according to the parameters entered by the customer is obtained, and a function to obtain the characteristic values of the cam performance in conjunction with the required cam device.

The customer setup program preferably has a function to notify a fact that the modifiable range of the basic 3D model set in advance is exceeded in the course of modification using the function to continuously modify the shape of the basic 3D model if it is so, and present a recommended basic 3D model to be selected next.

According to the invention, the cam device that satisfies desired conditions such as a processing power, a stroke, or the like can be designed easily by the customer in a limited space by using the three-dimensional design-support computer program according to the invention. In addition, on the basis of parameters set by the customer or a 3D model modified by the customer on the basis of these parameters, the shape including constructional details can be automatically achieved by the cam device manufacture without exceeding the size of the 3D model and without falling short of the performance. Therefore, since it is not necessary to repeat exchange of corrected data many times between the customer and the cam device manufacturer, the number of design steps is significantly reduced, which results in a superior advantage such that the design efficiency is dramatically improved.

Since the cam device manufacturer undertakes the task of manufacturing the cam device under the contract with the customer, the lead time for the manufacture is reduced in conjunction with the improvement of the design efficiency described above. Therefore, the term from order placement to delivery of the cam device is reduced, which significantly improves efficiency of die manufacture from the customers' point of view.

DETAILED DESCRIPTION OF THE PREFERRED EMBODIMENTS

Figure 1:
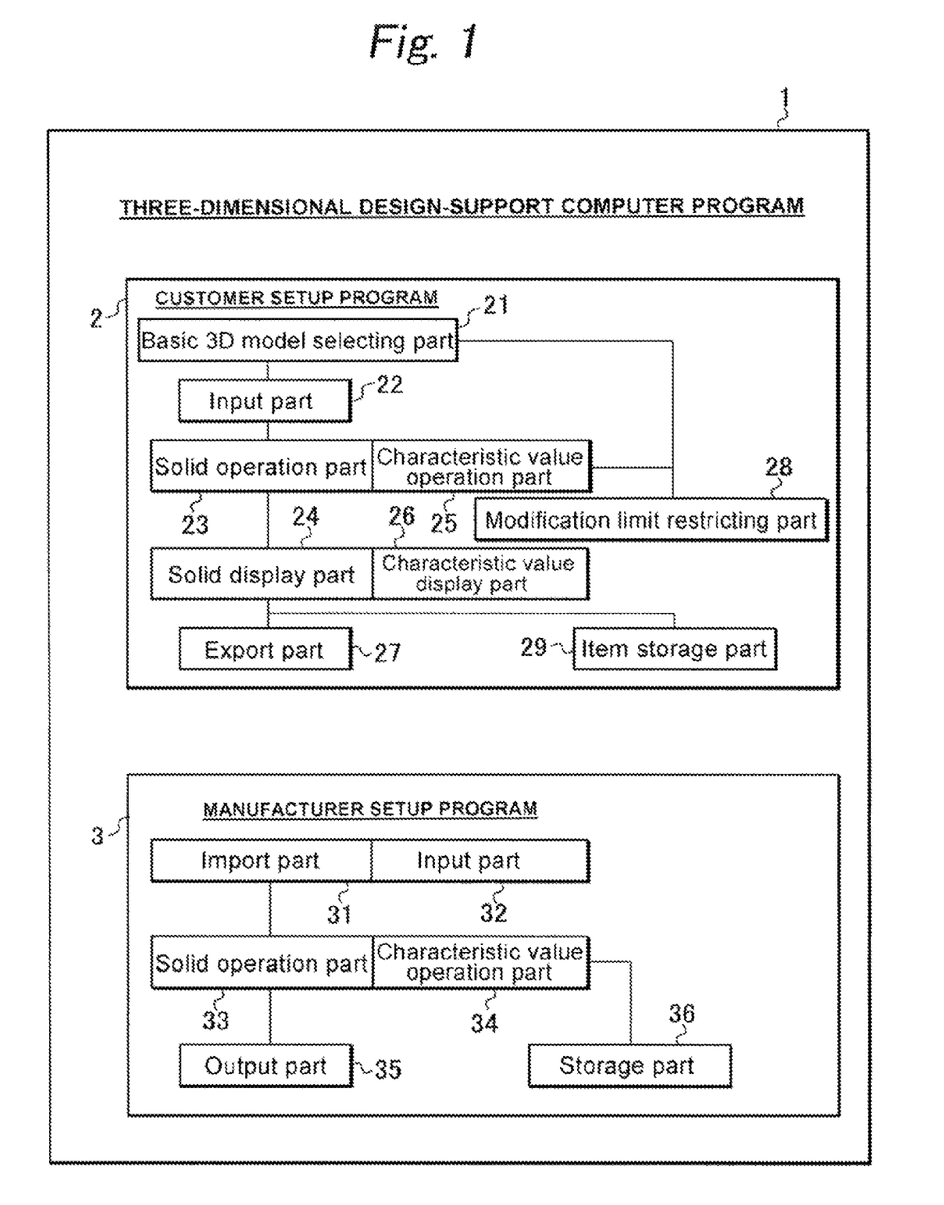
FIG. 1 is a drawing generally showing a configuration of a three-dimensional design-support computer program used in implementing a method of designing and manufacturing a cam device according to the invention.

FIG. 1 shows a three-dimensional design-support computer program used for implementing a method of designing and manufacturing a cam device according to an embodiment of the invention, which includes a customer setup program 2 for customers and a manufacturer setup program 3 for cam device manufactures.

The customer setup program 2 includes a basic 3D model selecting part 21 which causes a display device (monitor) to display a plurality of basic 3D models prepared according to the size and the usage of the cam device and causes a customer to select one of models. The customer setup program 2 also includes an input part 22 having parameter items for entering basic setup points relating to the shape of a cam device on the basis of a basic 3D model selected by the basic 3D model selecting part 21. The customer setup program 2 includes at least a solid operation part 23 configured to modify a region solid of the cam device to be displayed on the display device according to the parameters entered for the respective items on the input part 22 from a basic shape to a region solid after having set the parameter, a solid display part 24 configured to display the region solid on the display device, a characteristic value operation part 25 configured to calculate at least a processing power, a returning power, a stroke and the like from among characteristic values which indicate cam performance of the cam device, which are modified in conjunction with the parameter, a characteristic value display part 26 configured to display a result obtained by the characteristic value operation part 25 on the display device, and an export part 27 configured to output the region solid and the input parameters determined by the customer as well. In addition, the region solid and the input parameter determined by the customer are stored in an item storage part 29.

The customer setup program 2 includes a modification limit restricting part 28 configured to cause the solid operation part 23 to stop calculation for modifying the shape if the region solid of the cam device calculated by the solid operation part 23 on the basis of the input parameters is impossible in theory or exceeds a modifiable range preset by the manufacture in advance, cause the display device to display the fact that the limit is exceeded, and display a different recommended basic 3D model on the display device.

The manufacturer setup program 3 includes an import part 31 configured to receive input parameters entered into the input part 22 of the customer setup program 2 and output via the export part 27 and the region solid as arguments, a solid operation part 33 configured to calculate a 3D model reproduced to the constructional details for each component of the cam device on the basis of the arguments received by the import part 31, a characteristic value operation part 34 configured to calculate characteristic values which vary in conjunction with the arguments, an output part 35 configured to output the 3D model obtained by the solid operation part 33 as graphic data, and a storage part 36 configured to store the 3D model and the characteristic values. The graphic data includes, for example, 2D graphic data and 3D graphic data, both being the graphic data, which can be displayed on the display device by being selected either one or both arbitrarily through an input part 32.

The solid operation part 33 and the characteristic value operation part 34 are program parts, which can design the cam device to the constructional details including the know-how of the cam device manufacturer. Such know-how includes important decisions such as setting of clearances, setting of finishing, setting of the surface roughness, countermeasure for wearing, and setting of the material on the basis of experience in design and manufacture of the cam device. The solid operation part 23 in the customer setup program 2 and the solid operation part 33 in the manufacturer setup program 3, and the characteristic value operation part 25 in the customer setup program 2 and the characteristic value operation part 34 in the manufacturer setup program 3 are configured by common mathematical models, respectively. However, restrictions in design fineness are put on the solid operation part 23 and the characteristic value operation part 25 in the customer setup program 2 so as not to be capable of designing the cam device to the constructional details. It is for preventing leak of the cam device manufacturers know-how.

As described above, the customer setup program 2 is a program designed to prevent the cam device manufacturer's know-how in design and manufacture from leaking by restricting the fineness in design of the cam device. It is intended to restrict the fineness of output contents and display contents such as the 3D model and characteristic values as a result of design, and not to restrict design quality or customers convenience. In contrast, the manufacturer setup program 3 is a program in which the fineness in design of the cam device is not restricted at all, and is configured to automatically design the cam device including the constructional details and components required for design and manufacture thereof by entering the customer's setup parameters (input parameters, region solid) as arguments.

Figure 2:
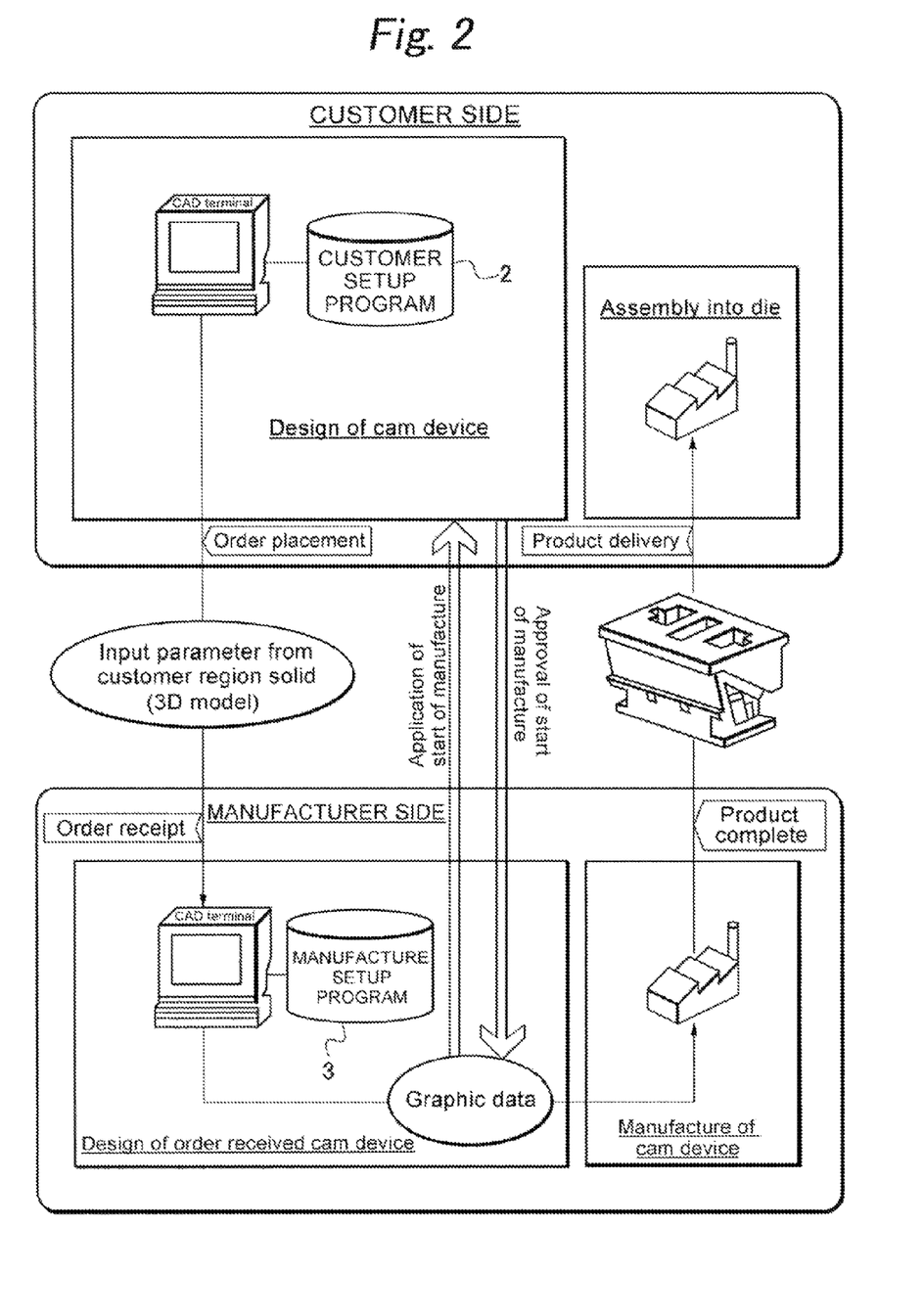
FIG. 2 is a block diagram generally showing a method of designing and manufacturing a cam device using the above three-dimensional design-support computer program according to the invention.
Figure 3:
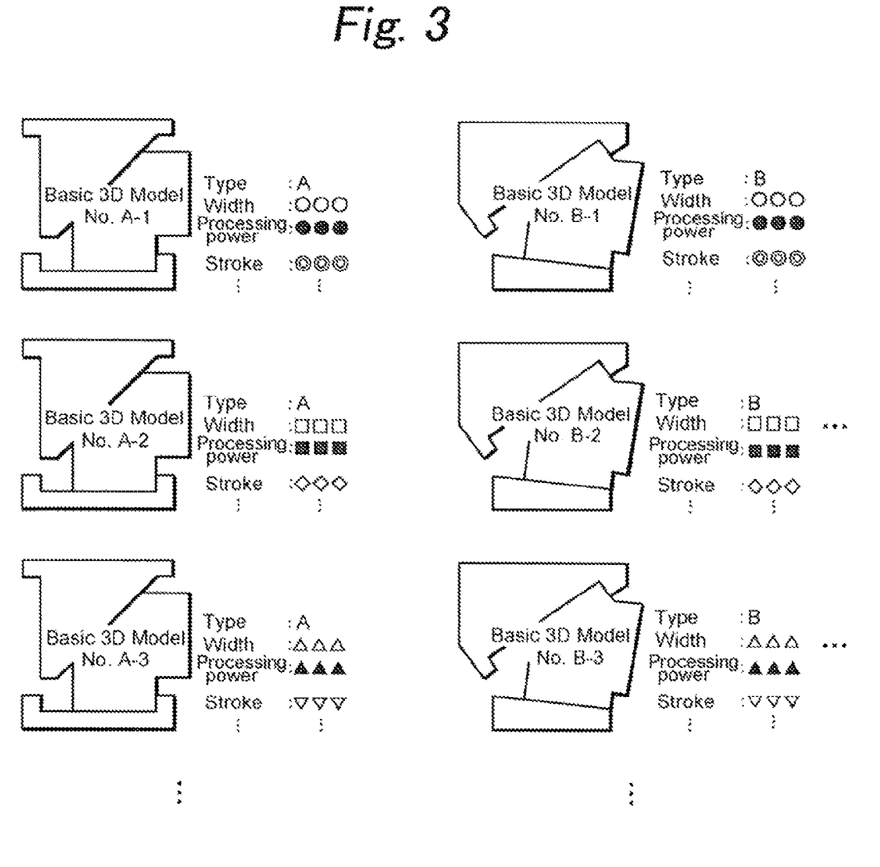
FIG. 3 is an image drawing showing an example of choices of basic 3D models from a basic 3D model selecting part in the same three-dimensional design-support computer program.

FIG. 2 shows a flow from design of a cam device by the customer through shipping of a cam device product until delivery of the cam device product to the customer by the cam device manufacturer in a case of implementing the method of designing and manufacturing the cam device according to the invention using the above-described three-dimensional design-support computer program. As shown in FIG. 2, the customer loads a customer setup program into CAD used normally for die design and designs the cam device. At this time, the customer selects one of basic 3D models which is dose to or matches requested specifications from among basic 3D models classified by usage or size or the like of the cam device in advance as shown in FIG. 3, provides the selected basic 3D models with design condition parameters and modifies the same, and designs the cam device.

Figure 4:
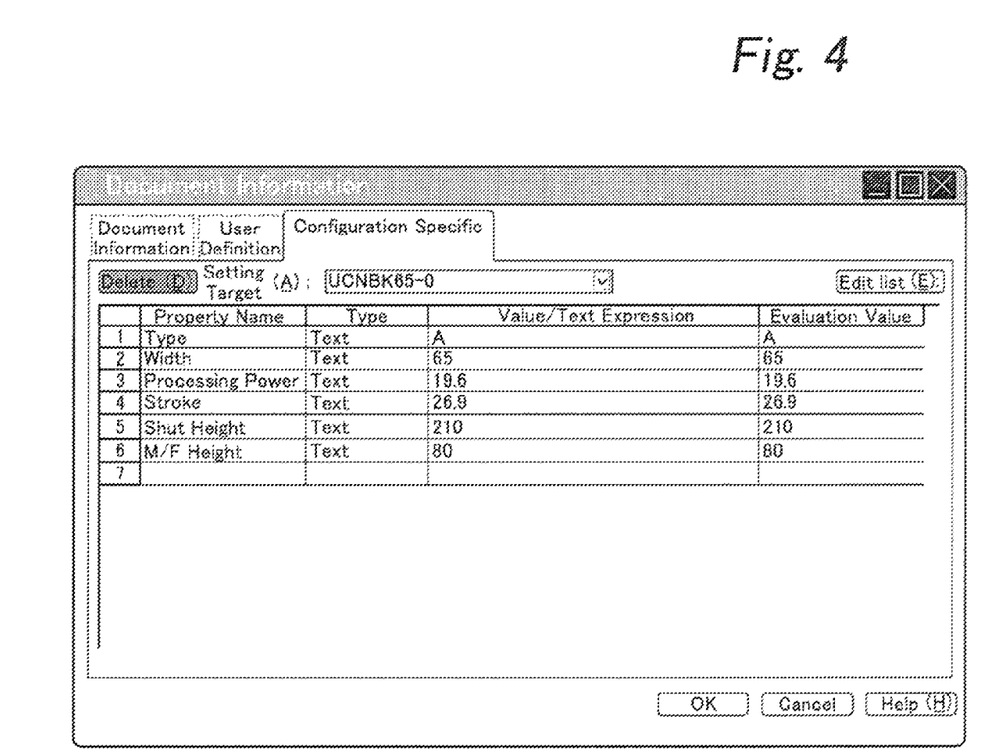
FIG. 4 is an image drawing showing an example of a region solid and input parameters handed from a customer to a cam device manufacturer.
Figure 5:
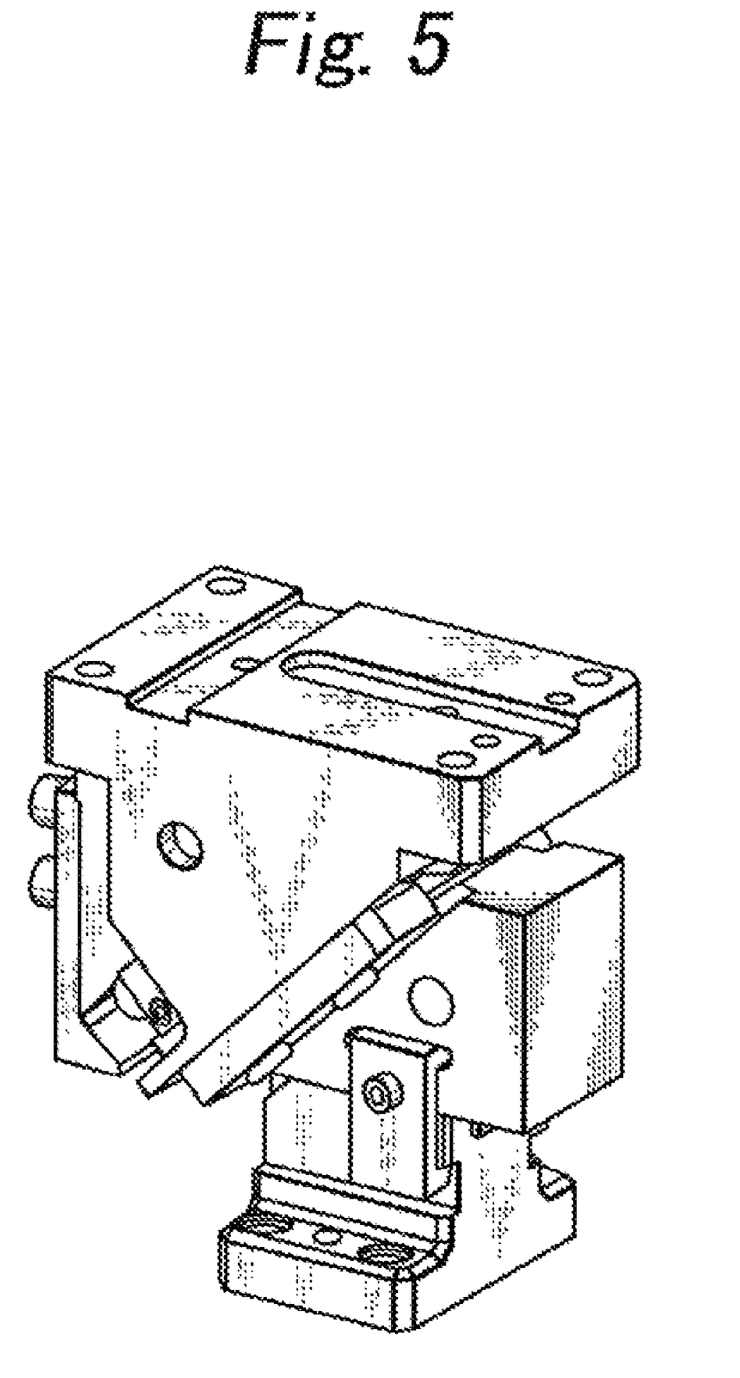
FIG. 5 is an image drawing showing an example of a 3D model in which a cam device finally designed by the customer including constructional details is reproduced using a manufacturer setup program in a method according to the invention.

A region solid which represents a region occupied by the shape of a component obtained as a result of design of the cam device with respect to the entire cam device when being displayed by display parts on the display device and input parameters are handed to the cam device manufacturers via communication means such as e-mail, means such as forwarding in the form of a recording medium such as a CD-ROM by post, or an information transmitting medium having a storage memory, and so on at the time of ordering the cam device products. FIG. 4 shows an example of the region solid and input parameters. The cam device manufacturer receives the region solid and the input parameter, loads one or both of them into a manufacturer setup program, and reproduces the cam device which is finally designed by the customer including the constructional details and the components as shown in FIG. 5. The graphic data per component required for manufacturing the reproduced cam device is obtained using the manufacture setup program. The obtained graphic data is presented to the customer. If manufacture is approved, the cam device is manufactured on the basis of the graphic data, and then the cam device product is delivered to the customer.

Figure 6:
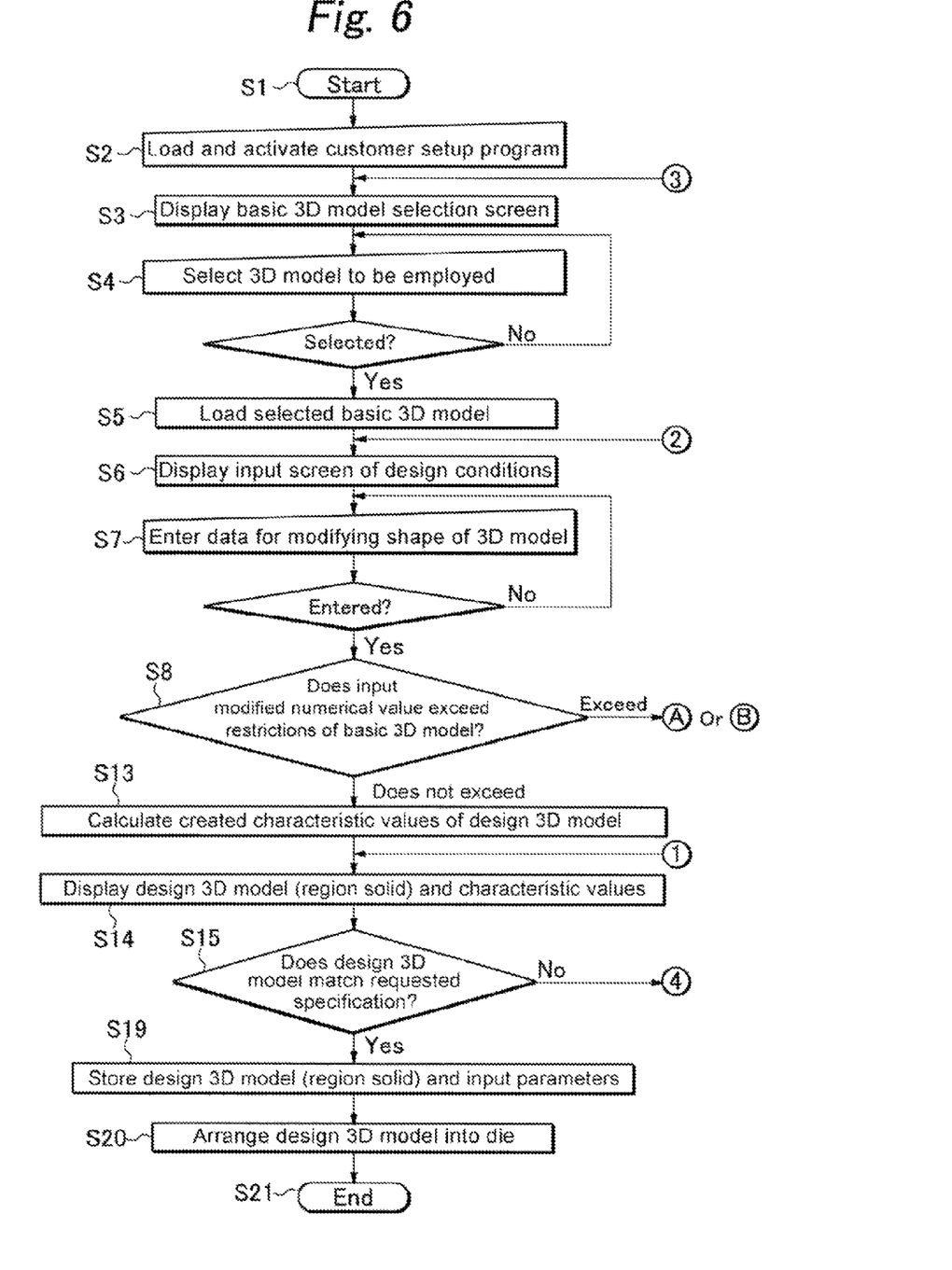
FIG. 6 is a flowchart showing an operating procedure of a customer setup program in the three-dimensional design-support computer program.
Figure 7A:
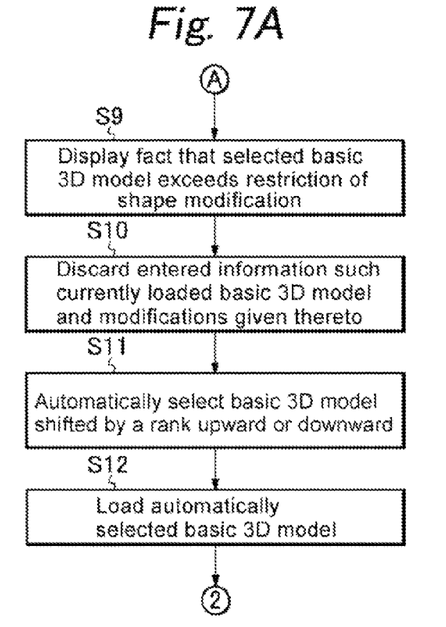
FIGS. 7A, 7B, and 7C are flowcharts showing operating procedures in subroutines A, B and (4) in the customer setup program.
Figure 7B:
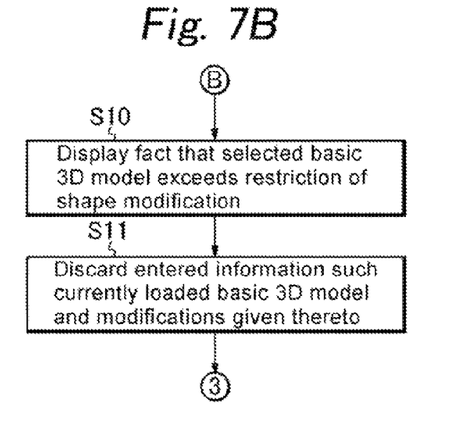
Figure 7C:
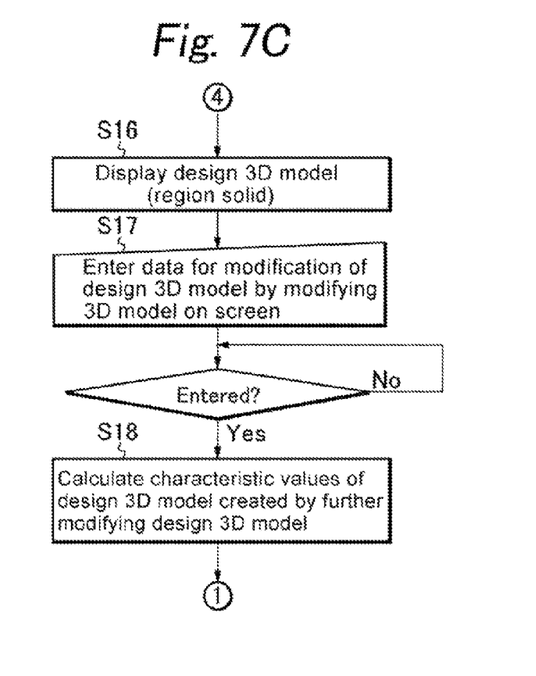
Figure 8:
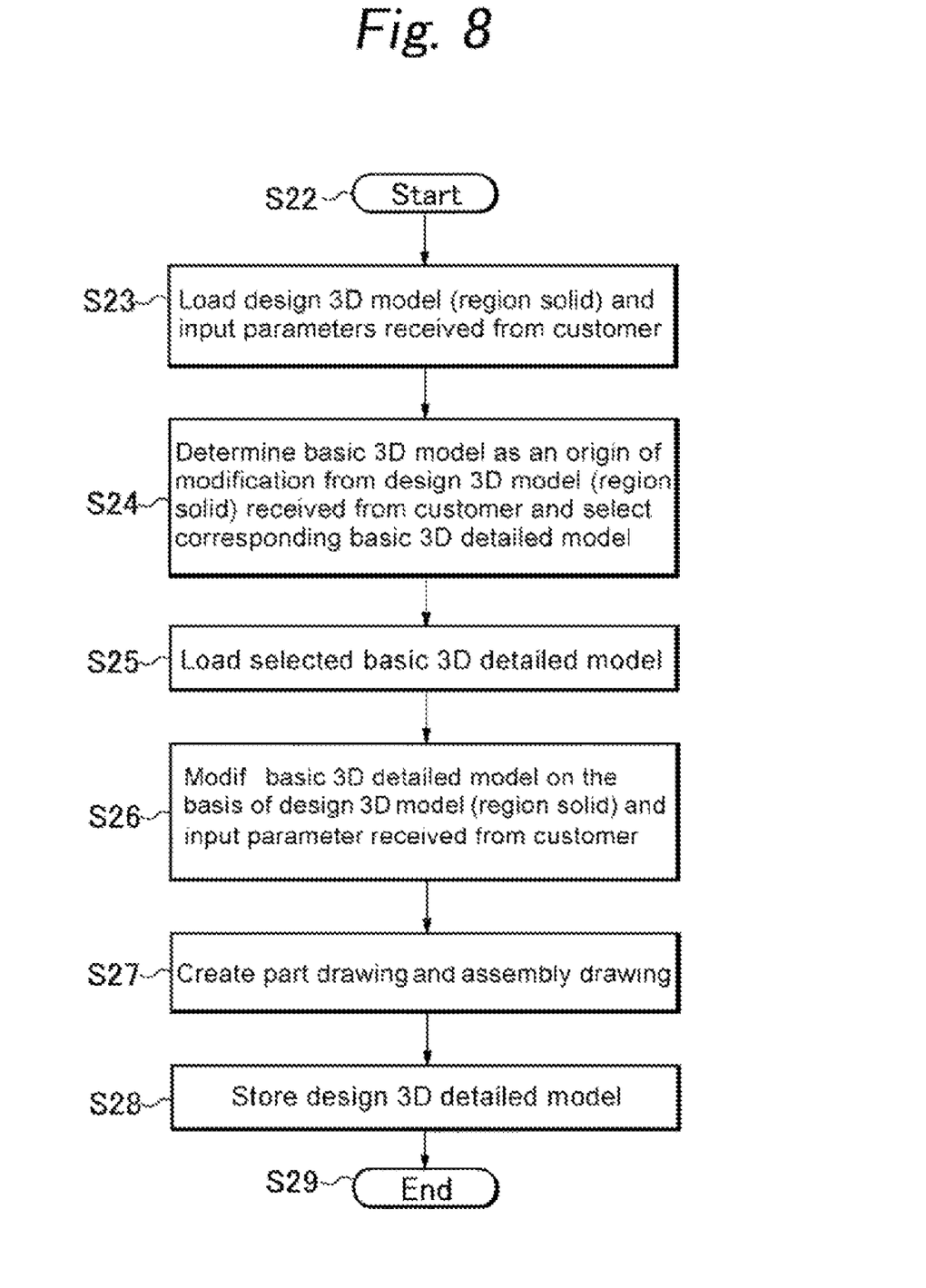
FIG. 8 is a flowchart showing an operating procedure of the manufacturer setup program.

Referring now to FIGS. 6-8, a detailed method of usage of the three-dimensional design-support computer program 1 according to the invention configured and used as described above will be described. As shown in FIG. 6, the customer receives the customer setup program 2 in the three-dimensional design-support computer program 1 by the cam device manufacture after the establishment of a contract on the precondition of an order placement of the cam device with the cam device manufacturer. Then the customer normally installs the customer setup program 2 in a CAD terminal used for the die design (Step 1; indicated by S1, hereinafter). Accordingly, the customer setup program 2 is ready to be executed. This Step 1 is a start point.

When the cam device needs to be designed at the time when the die design is performed using the CAD operated on the CAD terminal, the customer setup program 2 is loaded according to the method of operation of the corresponding CAD, and the customer setup program 2 is activated on the CAD (S2).

Upon activation of the customer setup program 2, the basic 3D model selecting part 21 displays a basic 3D model selection screen on the display device such as a monitor (S3). The customer selects a desired basic 3D model from the display and enters a number corresponding thereto using a keyboard (alternatively, the selection may be done by specifying the desired basic 3D models on the screen of the display device using a mouse or the like) (S4). The number entered using the keyboard is transmitted to the input part 22, and the selected basic 3D model is read (S5).

An input screen for entering design conditions and the basic 3D model relating to the selected basic 3D model are displayed on the display device (S6). On the input screen, input items are displayed on part of the screen, and the basic 3D model is displayed on part of the screen. The customer enters design conditions (processing power, stroke, etc.) and data on the modification of the shape using the keyboard (alternatively, the data on the modification of the shape may be entered by modifying the basic 3D model on the screen of the display device using the mouse or the like) (S7).

The input data (modified numerical values) entered using the keyboard is sent to a determination routine in which the modification limit restricting part 28 determines whether the restriction of the basic 3D model is exceeded or not (S8). If it is determined to exceed the restriction in the determination routine in S8, for example, the procedure jumps to subroutines shown in FIGS. 7A and 7B. One of subroutines A and B is loaded according to the request of the customer. Here, the fact that the restriction of the modification of the shape is exceeded is displayed on the display device (S9). Then, in S10, the entered information such as the currently loaded basic 3D model and modifications given thereto is discarded. Subsequently, the flow branches to the subroutines A and B. In the subroutine A, a basic 3D model shifted by a rank upward or downward is automatically selected (S11), and the automatically selected basic 3D model is loaded (S12). As shown by (2) in FIG. 6, the procedure goes back to S6, where the designing is restarted. In the case of the subroutine B, the procedure goes back to S3 as shown by (3) in FIG. 6, where the designing is restarted from the basic 3D model selection screen.

If it is determined that the modified numerical values do not exceed the restrictions of the basic 3D model, the solid operation part 23 and the characteristic value operation part 25 modify the basic 3D model, and calculate characteristic values including the load capability of the design 3D model and the like as numerical values and a 3D model (S13). The design 3D model (region solid) and the characteristic values are displayed in S14. Whether the design 3D model matches the specifications requested by the customer is determined in S15.

If it is determined not to match in S15, the procedure jumps to a subroutine shown in FIG. 7C. The design 3D model (region solid) is displayed in S16, and data for the modification of the design 3D model is entered using the keyboard in S17 (alternatively, the data may be entered by modifying the design 3D model on the screen of the display device using the mouse or the like). The solid operation part 23 modifies the design 3D model on the basis of the data entered in S18. In addition, the characteristic values of the prepared deigned 3D model are calculated by the characteristic value operation part 25. Subsequently, the procedure goes back to S14 shown in FIG. 6.

If it is determined to match in S15, the design 3D model (region solid) and the input parameters which are finally determined are stored in the item storage part 29 (S19).

The design 3D model (region solid) is arranged in the die being designed according to the method of operating the CAD in S20. Then the procedure is ended in S21.

Subsequently, in the manufacturer setup program 3 shown in FIG. 8, the program is activated and started on the CAD in the CAD terminal of the cam device manufacture in S22. Then, the import part 31 reads the design 3D model (region solid) and the input parameters received from the customer via communication means such as e-mail, means such as forwarding in the form of a recording medium such as a CD-ROM by post, or an information transmitting medium having a storage memory, and so on (S23). An original basic 3D model is determined from the loaded design 3D model (region solid) and the basic 3D detailed model corresponding to the basic 3D model is selected from the storage part 36 (S24), and data on the basic 3D detailed model is loaded (S25).

Subsequently, in S26, the basic 3D detailed model is modified by issuing a command from the input part 32 on the basis of the design 3D model (region solid) and the input parameter received from the customer. At this time, the design know-how is brought out, and graphic data such as detailed two-dimensional graphic data and three-dimensional graphic data on respective components are generated (S27). The design 3D detailed models of these components are stored in the storage part 36 (S28). If creation of drawings is needed, drawing data is output via the output part 35 such as a plotter, so that the drawings are created. Then, the procedure is ended (S29). The created two-dimensional or three-dimensional manufacture drawings of the 3D model and the like are made available for manufacture of the cam device, or may be handed to the customer for confirmation.

In this manner, the design 3D detailed model in which the design know-how is utilized is achieved on the basis of the design 3D data that satisfies the customer, and labors such as the repeated exchange of the points of modification with the customers can be eliminated, whereby the term of work required for design and manufacture is dramatically reduced.

The method of designing the cam device and the three-dimensional design-support computer program to be used therefor according to the invention can be applied widely in the case where the design is exchanged between the customer and the manufacture for exchanging the design data without leaking the know-how to the outside.

What is claimed is:

1. A method of designing and manufacturing a cam device using a three-dimensional design-support computer program including a customer setup program for customers and a manufacture setup program for cam device manufactures, the customer setup program and the manufacture setup program being configured to generate different finenesses in 3D models and characteristic values of cam performance, which are output or displayed as a result of design of the cam device, and being configured so as to obtain a result which indicates the same cam device except for fineness and the required calculation items when same parameters are loaded, wherein the customer setup program is lent from the cam device manufacture to the customer on the assumption of an order placement of the cam device to the cam device manufacture from the customer, and detailed design to constructional details of the cam device is performed using the manufacture setup program on the basis of design data created using the customer setup program and handed to the cam device manufacturer, whereby the cam device is manufactured on the basis of the detailed design drawing.

2. A three-dimensional design-support computer program comprising a customer setup program and a manufacturer setup program, wherein the customer setup program is configured to calculate the shape of a component which affects a region solid from among components which constitute an entire cam device, a positional relationship of the component in the entire cam device, and characteristic values of the cam performance according to parameters entered by a customer, and to display results as the region solid and numerical values, the region solid representing a region occupied by the shape of the component with respect to the entire cam device when being displayed by a display part on a display device, and the manufacture setup program is configured to load parameters that have satisfied conditions required by the customer using the customer setup program and supplied thereto as arguments, and reproduce the cam device designed by the customer including the constructional details on the basis of the arguments without restrictions of fineness.

3. The three-dimensional design-support computer program according to claim 2, wherein the customer setup program includes at least a function to continuously modify a shape of a basic 3D model prepared according to the size and usage of the cam device until a required cam device according to the parameters entered by the customer is obtained, and a function to obtain the characteristic values of the cam performance in conjunction with the required cam device.

4. The three-dimensional design-support computer program according to claim 3, wherein the customer setup program has a function to notify a fact that the modifiable range of the basic 3D model set in advance is exceeded in the course of modification using the function to continuously modify the shape of the basic 3D model if it is so, and present a recommended basic 3D model to be selected next.

* * * * *